Figure 1:
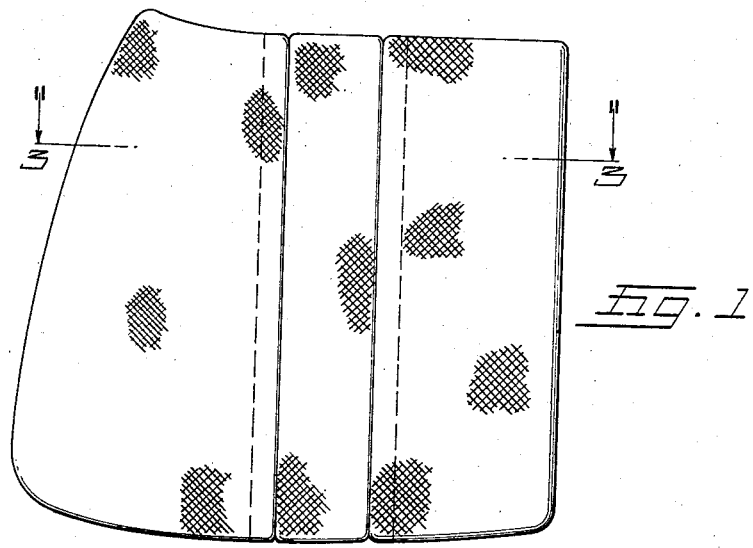

June 4, 1940.　　　H. J. WOODALL　　　2,202,977
LAMINATED TRIM PANEL
Filed May 25, 1938　　　3 Sheets-Sheet 1

INVENTOR.
HERBERT J. WOODALL
BY Parker & Burton
ATTORNEY.

INVENTOR.
HERBERT J. WOODALL
BY Parker & Burton
ATTORNEY.

Patented June 4, 1940

2,202,977

UNITED STATES PATENT OFFICE 2,202,977

LAMINATED TRIM PANEL

Herbert J. Woodall, Detroit, Mich., assignor to Woodall Industries Incorporated, Detroit, Mich., a corporation of Michigan Application May 25, 1938, Serial No. 209,997

4 Claims. (Cl. 154—45.9)

This invention relates to improvements in covered laminated trim panels such as are used on the doors and side walls in the interior of automobile bodies and it applies particularly to panels provided with an embossed design.

An object is to provide an improved covered laminated trim panel exhibiting an embossed design wherein adjacent panel areas are separated by debossed lines or grooves into which the covering material is so drawn and secured that it will not come loose. By embossed I refer to that appearance characteristic of padded upholstery, which the outer face of the panel presents, regardless of whether the panel includes wadding between the trim cloth and foundation layer. By debossed line or groove I mean that groove or channel which separates and defines adjacent embossed panel areas.

Another object is to provide such a panel wherein the interior debossed lines or grooves which separate the adjacent embossed panel areas are sharp, clear, well defined, and permanent for the life of the panel. Another object is to provide relatively deep and narrow debossed grooves as these deep narrow grooves give to the panel the appearance of rich, heavy upholstery padding even though only a minimum quantity of wadding or no wadding at all has been used.

Heretofore it has been the practice to provide upholstery trim panels with a padded embossed design by stitching the trim material through wadding to a panel foundation board along interior lines defining the desired embossed design or by securing the trim material to the foundation board along a compacted line of wadding outlining an uncompressed area thereof by adhesive saturation of the wadding along said compacted line sufficient to hold the wadding compacted and to hold the trim material through said compacted line of wadding to the foundation layer. Embossed trim panels have also been fabricated by securing trim cloth directly to a foundation layer exhibiting an embossed design or by securing the cloth directly to a thermoplastic foundation board and thereafter shaping the covered board to the embossed design. The word "cloth" or "trim cloth" where used herein to describe the outer upholstery trim or covering material is intended to include felted or woven fabrics, leather, either natural or artificial, or any other suitable trim covering material.

In each of these prior practices of producing trim panels presenting an embossed design the debossed line or groove which separated adjacent panel areas resulted solely from the adhered or stitched securement of the trim cloth to the outer face of the foundation board. As a result any undue tensioning of the cloth during its securement or undue tensioning resulting from expansion and contraction under atmospheric changes produced strains that frequently caused loosening or breaking of the stitching or the adhesive bond thereby permitting the cloth to break away from the foundation board along its line of securement within the debossed line and as a result the appearance of the embossed design was badly impaired or destroyed.

In each of these prior practices there was an absence of permanence to the debossed groove due to this tendency of the trim cloth under strain to loosen and pull away from the foundation layer along the debossed groove. Where saturation by adhesive along a compacted line of wadding was depended upon for the production of the padded design, this lack of permanence might be due to the breaking down of the adhesive bond along the compacted line as a result of age, atmospheric changes and attack of cleaning fluids upon the adhesive.

Stitching possessed the additional disadvantage of weakening the foundation board along the line of stitching and breakage of the board along such line frequently occurred. Furthermore, the stitch apertures opened up the interior of the board to the attack of moisture increasing the danger of buckling and warping due to moisture absorption. In boards which had been waterproofed through the employment of asphaltum binders the stitches tended to wick the oils to the surface of the trim material upon attack of the asphalt by cleaning fluid solvents with resulting discoloration of the trim cloth.

In addition it was not commercially practicable with any one of these prior practices to produce a sharp clear permanent well defined interior line of demarcation between adjacent padded or embossed areas. Neither was it readily feasible with any one of these prior practices to produce relatively narrow and deep debossed lines or grooves separating adjacent panel areas.

Another object is the provision of a covered laminated trim panel employing composition fiber board as a foundation layer, which fiber board to a greater or less degree expands and contracts in response to atmospheric changes, which panel may be of large size, but which is so fabricated that the tendency to unsightly buckling and warping due to expansion and contraction is minimized and such buckling should it occur is so localized and directed as to minimize its unsightly appearance.

Heretofore trim panels having fiber board foundations have all possessed in varying degree the disadvantageous characteristic of expansion and contraction under moisture absorption. Atmospheric changes frequently produced buckling or warping of the panels. Constant endeavor has been made to overcome this difficulty. Surface waterproofing treatments, moisture resistant binders, establishment of moisture seepage barrier lines within the fiber board, improvement of the board itself all have received a vast amount of attention looking toward the minimizing of this tendency of panels to buckle and warp in use. My invention eliminates to a very substantial degree this hazard.

An important feature is that my improvement lends itself unusually well to the fabrication of panels presenting a multi-tone color effect in that adjacent panel areas separated by permanent debossed lines may be covered with trim material of different color and texture.

In my improved panel adjacent areas may be covered with trim material of different color or texture. Such adjacent padded areas are separated by sharp clear groove lines which may be relatively deep and narrow. Such interior grooves defining the padded areas are permanent and the trim cloth drawn therein is securely held against detachment or loosening. The construction is such that buckling and warping is so minimized as to be practically not noticeable. Should such buckling occur it may be controlled so as not to impair the appearance of the panel.

Figure 2:
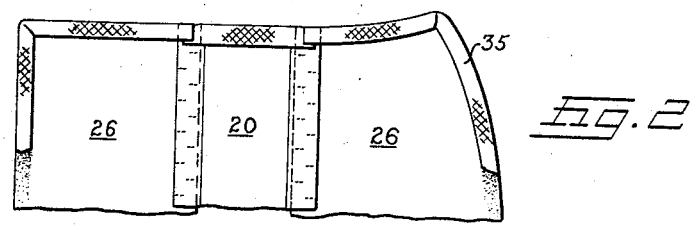
Figure 3:
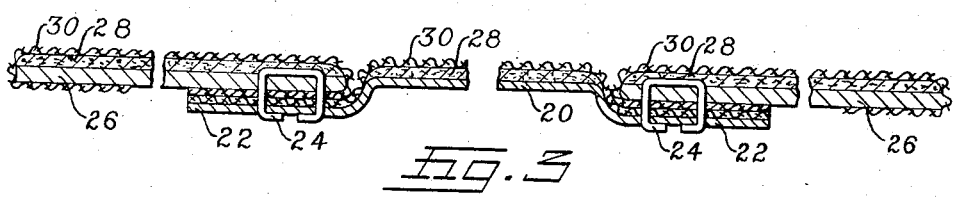
Figure 4:
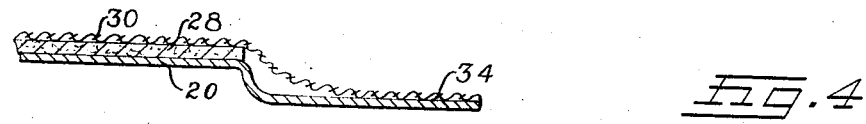
Figure 5:
Figure 6:
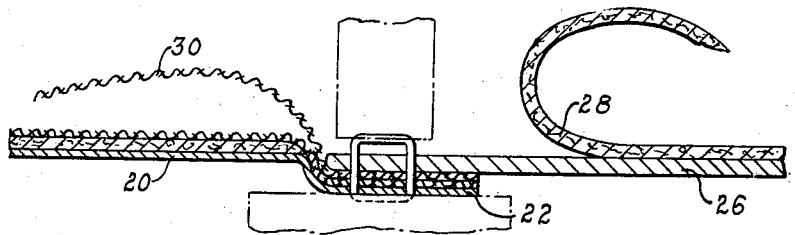

Other objects, advantages, and meritorious features of this invention will more fully appear from the following description, appended claims, and accompanying drawings, wherein:

Figure 1 is a side elevation of a front face of a panel structure embodying my invention, Fig. 2 is a side elevation of the rear face of the fragment of the panel of Fig. 1, Fig. 3 is a cross-sectional view on line 3—3 of Fig. 1, Fig. 4 is a cross-sectional view through the central area of Fig. 1 during fabrication, Fig. 5 is a cross-sectional view through a fragment of one of the marginal areas of the panel of Fig. 1 during fabrication, Fig. 6 is a cross-sectional diagrammatic view through a fragment of the intermediate area and a fragment of a marginal area of the panel structure of Fig. 1 during the process of fabrication.

Figure 7:
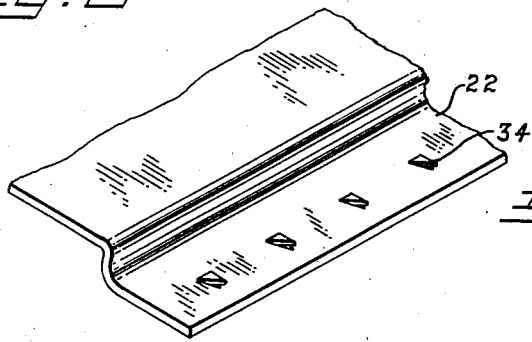
Figure 8:
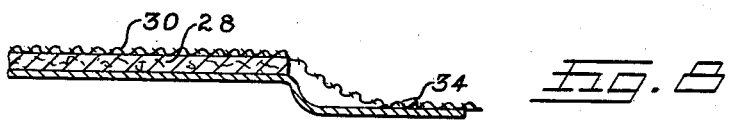
Figure 9:
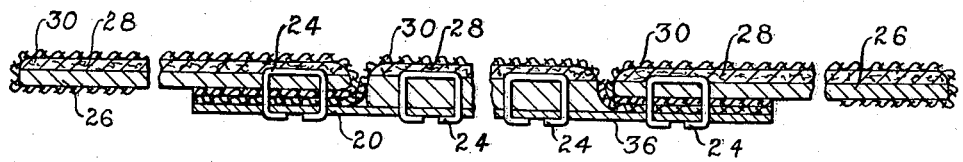
Figure 10:
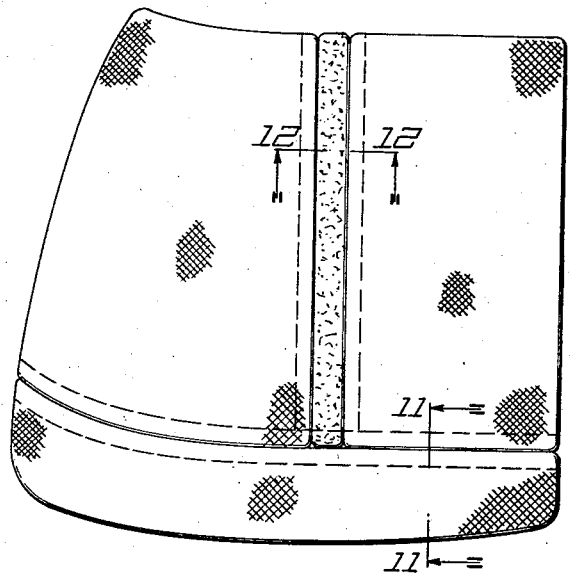
Figure 11:
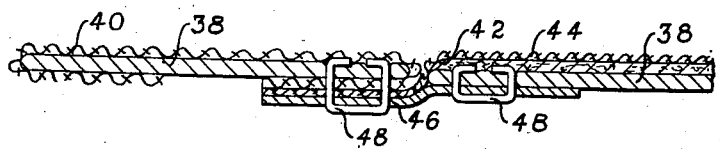
Figure 12:
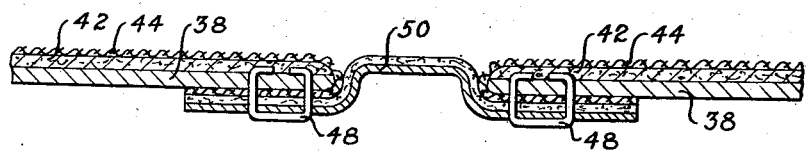

Fig. 7 is a perspective of a fragment of a modified type of intermediate area foundation layer, Fig. 8 is the cross section through a fragment of the intermediate layer as shown in Fig. 7 with wadding and trim cloth overlying the same, Fig. 9 is a cross sectional view similar to Fig. 3 but showing the intermediate section as formed of fiber board, Fig. 10 is a side elevation of the front face of a trim panel showing my invention modified slightly as compared with the construction of Fig. 1, Fig. 11 is a cross sectional view taken on line 11—11 of Fig. 10, and Fig. 12 is a cross-sectional view taken on line 12—12 of Fig. 10.

In the fabrication of my improved panel adjacent panel areas are separated or defined by permanent debossed lines or grooves which preferably are relatively deep and narrow. These panel areas so separated give to the panel its embossed appearance. Preferably these areas are padded. Each of these areas includes a separate panel foundation layer or board section individually provided with trim cloth and, if a padded panel is desired, with wadding. Any suitable type of wadding may be used. Any suitable type of foundation board may be used. Such foundation board is generally a fibrous composition board. Fabricated fiber board such as Masonite may be used. In certain panel forms herein illustrated fiber board is used as a foundation layer in one area and sheet metal is used as a foundation layer in another area.

These several sections or areas are so secured together as to provide a panel structure of the required strength and rigidity. The trim cloth is so secured to the panel along the interior debossed line separating adjacent panel areas that no undue tension is placed on the cloth and the danger of its loosening or breaking away along such line is eliminated.

The attachment of the cloth may furthermore be of such a character that the bottom of the debossed line or groove is covered therewith and the cloth is held securely within the bottom of said groove against danger of detachment.

Due to the fabrication of the improved panel out of a plurality of relatively small sections the danger of buckling or warping of the panel due to contraction and expansion is substantially minimized. This fact is most important in the trim panels of large size which are now being so extensively used in the interior of automobile bodies. Due to the very secure attachment of the trim cloth to each panel foundation section and due to the relatively small size of each section loosening of the cloth under expansion and contraction of atmospheric changes is substantially eliminated. Should buckling occur the unsightly appearance resulting therefrom is minimized in that the connection lines of adjacent areas may serve as hinge lines between such areas of embossment.

The separate panel areas which make up my improved panel have their foundation layers secured together by bridging elements which may be separate from the foundation layers or may form a part of one foundation layer. These bridging elements span the joint between adjacent foundation areas and secure them together to impart the required rigidity to the panel foundation.

Each foundation area is provided with trim material which may consist of trim cloth alone or trim cloth plus wadding. The trim cloth from two adjacent foundation areas is drawn down between the two foundation areas and secured at the back thereof. Preferably such trim cloth is drawn over the bridging element covering the bottom of the groove between said two areas and is secured by the bridging element to the back of one of the foundation areas against detachment or loosening. Such form of attachment holds the cloth secure against loosening. Drawing the cloth through the joint over the margins of the slightly spaced apart foundation layers of two adjacent areas provides a sharp well defined relatively deep and narrow debossed groove.

In the construction shown in Figs. 1 to 3 inclusive, my invention is illustrated as embodied in a panel made up of a central vertical intermediate area and opposed marginal areas secured to opposite sides of the intermediate area. In this construction the intermediate area is shown as formed of sheet metal and indicated as 20.

The opposite marginal portions are offset laterally and bent to form bridging elements 22 which overlap the marginal portions of the two outer area foundation layers 26, as shown in Fig. 3, and which are secured thereto. This securement may be by means of wire stitches 24 as shown. The foundation layer of each outer area may be formed of any suitable composition fiber board or any other suitable material. A commercial product known as Masonite is suitable for this purpose. These foundation layers 26 are wire stitched to the intermediate area spaced slightly from the shoulders thereof, which shoulders form what might be termed the marginal edges of this intermediate area 20 disposed opposite the marginal edges of the foundation layers 26.

In this construction the foundation layer of the intermediate area is the metal piece 20 and the foundation layer of each outer marginal area is the Masonite portion 26. In this construction a padded trim panel is shown and each area is shown as provided with wadding indicated as 28. Each area is also shown as provided with trim cloth indicated as 30. As heretofore stated the wadding and the trim cloth may be of any suitable desired character. The fabrication of such a panel is illustrated in Figs. 4, 5 and 6. The trim cloth 30 is drawn over the wadding 28 of the intermediate area 20 and may be glued down adjacent the margins as shown in Fig. 4 or such securement may be by means of lugs 34 punched up from the marginal bridging portion 22 as shown in Fig. 7.

Trim cloth 30 may be secured along one margin to the rear face of a marginal foundation area 26. This securement may be by means of adhesive as illustrated in Fig. 5. In connection with the construction of Fig. 7 the trim cloth 30 will be drawn down and pushed over these lugs 34 as shown in Fig. 8. The two marginal areas 26 and the intermediate area 20 may then be brought together as illustrated diagrammatically in Fig. 6 with the wadding 28 of the marginal area 26 turned back on one side and with the trim cloth 30 of the marginal area 26 thrown to the opposite side so that the wire stitching operation may be carried out.

In this figure it will be seen that the trim cloth for the area 26 is secured in overlying relationship over the trim cloth for the area 20 by the wire stitching. It is secured in place between the bridging element 22 and the foundation layer 26 of the outer marginal area. This same operation is repeated along the opposite margin of the intermediate area. The trim cloth along each outer marginal edge of the panel is then folded over as at 35 in Fig. 2 and secured adhesively to the rear face of the foundation layers as shown.

In the construction shown in Fig. 9 the foundation layer of the intermediate area is formed of fiber board as are the foundation layers of the outer marginal area. The bridging elements 36 are separate from the foundation layers and may be formed of suitable sheet metal of sufficient stiffness to lend the proper rigidity to the complete panel but they may be sufficiently flexible to permit a slight hinging movement along the joint if desired. In this Fig. 9 the bridging elements 36 are shown as wire stitched to the intermediate panel area as well as to the outer marginal area. Stitching to the intermediate area would be carried out before covering thereof. The trim cloth is secured to each outer marginal area in the manner illustrated in Fig. 3, that is, the trim cloth for each outer marginal area overlaps the trim cloth of the intermediate marginal area and this trim cloth is held down between the bridging element and the outer marginal foundation layer by the wire stitching.

Fig. 10 illustrates a slightly modified form of panel wherein a panel is made up of four sections. There is a marginal portion along the foot of the panel which may be covered with carpet. The two vertical marginal areas of the panel may each carry wadding but the intermediate area of the panel may be left unpadded and may be formed of metal which might be covered with cloth, leather, or any other suitable trim covering and the metal might be shaped so as to conform with the shape of the padded marginal areas to produce the desired embossed appearance. The construction of this figure is further illustrated in Figs. 11 and 12. The foundation layer of the bottom marginal portion and of each side marginal portion is indicated by the numeral 38 and this foundation layer may be formed of fiber board as described. The bottom marginal portion may be without wadding and suitable heavy carpet 40 may be spread thereover. Each vertical marginal portion may be provided with wadding 44 and trim cloth 42. The metal bridging strip 46 may be slightly offset so as to compensate for the thickness of the carpet and cloth which extends underneath the bottom marginal portion 38. This bridging element would be formed of suitable sheet metal as heretofore described. It would be wire stitched in place by wire stitches 48 as heretofore described.

In Fig. 12 the intermediate foundation layer of metal indicated as 50 is not provided with any wadding. The fiber board foundation layers 38 of the two side marginal areas are wire stitched to the laterally offset marginal portions of the intermediate area 50 by the wire stitches 48 as shown and suitable trim covering such as cloth or leather may be stretched directly over the foundation layer 50 and secured by the wire stitches in place as shown.

It is apparent that a panel may be built up of such a number of separate areas as are desired and that these may be arranged in any desired manner so as to produce the appearance sought. The forms shown are merely illustrative. The foundation layers of these several areas may be padded or not as it is desired and an embossed effect may be produced without padding by properly shaping the foundation layers as is shown in conjunction with the construction of Fig. 12. Wire stitching has been here shown as a preferred method of securing the several areas together through the bridging elements but any suitable method of securement might be employed.

Preferably the opposed marginal edges of the adjacent areas are brought relatively close together so that when the trim cloth is extended through the joint formed therebetween and onto the back of the panel a relatively deep and narrow debossed groove is formed between the adjacent areas. Securement of the trim cloth to the back of a panel foundation area along this interior debossed groove provides such a secure attachment that loosening of the cloth causing it to pull away from the bottom of the groove is eliminated and the covered debossed groove permanently retains its desired appearance.

The building up of a panel in this manner and the securement of the trim cloth as shown gives to the embossed appearance of the panel a permanency which will continue for the useful life of the panel. Large panels built up in this fashion will exhibit very little tendency to buckling or warping. Furthermore the bridging elements may possess sufficient flexibility to permit a hinged action to accommodate for any tendency toward buckling so that the unsightly appearance thereof would be minimized if not entirely overcome. It is obvious that with this method of trimming the panel different colors and different textures of fabric may be employed throughout different panel areas. The possibility of decorative design is substantially enlarged.

What I claim is:

1. A laminated trim panel exhibiting an embossed design including two adjacent panel areas presenting an embossed appearance and separated by a debossed groove, each of said two areas comprising a foundation layer and a layer of trim material including a layer of trim cloth overlying each of said foundation layers, a bridging element connecting said adjacent foundation layers together with opposed margins slightly spaced apart, said trim cloth for said two areas along the adjacent opposed margins of the connected foundation layers being extended through the joint between said opposed margins and being extended in juxtaposition over the underlying bridging element and underneath one of the foundation layers and there secured in place.

2. A laminated trim panel comprising an intermediate panel area and two outer foundation areas disposed along opposite margins of the intermediate area, each panel area including a foundation layer and trim material including trim cloth overlying each foundation layer, said intermediate foundation layer being formed of metal and having laterally offset marginal bridging element portions overlapping the adjacent marginal portions of the two outer foundation layers and secured thereto, the trim material over the intermediate foundation layer being extended through the joint formed with each outer foundation layer and over said bridging element portion and onto the back of the outer foundation layer and there secured in place.

3. A laminated trim panel comprising an intermediate foundation layer and two outer foundation layers disposed along opposite margins of the intermediate layer, a layer of trim material including trim cloth overlying each foundation layer, said intermediate foundation layer connected with each outer foundation layer by a bridging element secured to the back of each outer foundation layer, the trim cloth over the intermediate foundation layer being extended through the joint formed with each outer foundation layer and onto the back thereof between the bridging element and said outer foundation layer and there secured in place, the trim material over each outer area foundation layer being extended through the joint formed with the intermediate foundation layer and over the extended trim material of said intermediate layer between the outer area foundation layer and the bridging element and there secured in place.

4. A laminated trim panel exhibiting an embossed design including two adjacent panel areas presenting an embossed appearance and separated by a debossed groove, each of said two areas including a panel foundation layer and trim material including a layer of trim cloth overlying said foundation layer, a bridging element extending across the joint between said two foundation layers connecting them together with opposed margins spaced slightly apart, the trim cloth for said two areas being extended between the adjacent opposed margins of the connected foundation layers through the joint formed therebetween and being extended in juxtaposition over the underlying bridging element and underneath one of the foundation layers and there secured in place, a third foundation layer extending across and adjacent to one end of said two foundation layers, a bridging element extending across the joint between said third foundation layer and said first two foundation layers connecting said third foundation layer to said two first mentioned foundation layers, trim material including a layer of trim cloth extending over said third foundation layer and through the joint formed between said layer and said two first mentioned foundation layers, the trim cloth over each of said two first mentioned foundation layers and the trim cloth over said third foundation layer being extended in juxtaposition through said joint and over the bridging element underlying said joint and onto the back of the third foundation layer and there secured in place.

HERBERT J. WOODALL.